United States Patent [19]

Buzak

[11] Patent Number: 4,726,663
[45] Date of Patent: Feb. 23, 1988

[54] SWITCHABLE COLOR FILTER WITH ENHANCED TRANSMISSIVITY

[75] Inventor: Thomas S. Buzak, Beaverton, Oreg.

[73] Assignee: Tektronix, Inc., Beaverton, Oreg.

[21] Appl. No.: 930,630

[22] Filed: Nov. 14, 1986

[51] Int. Cl.[4] .......................... G02F 1/13; G09G 1/28
[52] U.S. Cl. .................. 350/347 E; 350/335; 350/347 R; 350/337; 340/703
[58] Field of Search ............... 350/335, 347 E, 347 R, 350/337; 340/703

[56] References Cited

U.S. PATENT DOCUMENTS

| | | | |
|---|---|---|---|
| 4,333,708 | 6/1982 | Boyd et al. | 350/341 |
| 4,566,758 | 1/1986 | Bos | 350/347 E |
| 4,582,396 | 4/1986 | Bos et al. | 350/347 E |
| 4,670,744 | 6/1987 | Buzak | 350/335 |
| 4,674,841 | 6/1987 | Buzak | 350/347 E |

OTHER PUBLICATIONS

"Twisted Nematic Display with Cholesteric Reflector," *J. Phys. D: Appl. Phys.*, vol. 8, 1441-48, (1975), by Scheffer.

Primary Examiner—Stanley D. Miller
Assistant Examiner—Trong Quang Phan
Attorney, Agent, or Firm—John D. Winkelman; Paul S. Angello

[57] ABSTRACT

A switchable color filter employs chiral liquid crystal circular polarizers to minimize the attenuation of light passing through a system in which it is incorporated. One preferred embodiment (12) of the switchable color filter includes a light modulator (32) positioned between the light polarizing assembly (20) and first and second chiral liquid crystal cells (36 and 38). The light polarizing assembly receives unpolarized light and transmits circularly polarized light of colors included within first and second narrow color bands. The first chiral cell reflects incident light within the first color band and in a first polarization state, and the second chiral cell reflects incident light within the second color band and in a second polarization state. The light modulator cooperates with a switching circuit (34) to selectively provide first and second polarization switching states. The first switching state causes light within the first color band to exit the color filter and blocks light within the second color band from exiting the color filter, and the second switching state causes light within the second color band to exit the color filter and block light within the first color band from exiting the color filter. Another preferred embodiment (100) of the switchable color filter is capable of receiving light within three color bands and selectively providing a light output of one of three colors. Either embodiment of the switchable color filter can be advantageously implemented in systems (10 and 100) that are insensitive to a restricted viewing angle, which stems from the use of chiral liquid crystal circular polarizers.

20 Claims, 8 Drawing Figures

SWITCHABLE COLOR FILTER WITH ENHANCED TRANSMISSIVITY

TECHNICAL FIELD

The present invention relates to switchable color filters and, in particular, to such a color filter that employs chiral liquid crystal circular polarizers to minimize the attenuation of light passing therethrough.

BACKGROUND OF THE INVENTION

Conventional switchable color filters typically employ dye-type color selective polarizing filters in association with a polarization state modulating device to selectively develop light outputs of different colors. A switchable color filter of this type typically receives incident visible light of many wavelengths or colors. The switchable color filter introduces a first preselected polarization state into light of the color to be transmitted and introduces a second preselected polarization state into light of the colors to be blocked. Although they enable the construction of color filters having relatively high image contrast and large viewing angles, dye-type color selective polarizing filters absorb a significant amount of light. This is true even for the colors of light these polarizing filters transmit. The use of switchable color filters of this type in a display system reduces the overall transmissivity.

SUMMARY OF THE INVENTION

An object of the present invention is, therefore, to provide a switchable color filter with enhanced transmissivity.

Another object of this invention is to provide such a switchable color filter that is adaptable for use in display systems whose applications require high image brightness but are insensitive to limited viewing angles.

A further object of this invention is to provide such a switchable color filter that employs color selective polarizing filters of a type that facilitates an overall increase in transmissivity.

The present invention is a switchable color filter with enhanced transmissivity. The switchable color filter, of which there are two preferred embodiments described herein, receives and transmits visible light whose spectral components are included within at least two color bands.

One preferred embodiment of the switchable color filter includes a light polarizing assembly that receives unpolarized light and transmits circularly polarized light of colors included within first and second narrow color bands. The color filter also includes first and second chiral liquid crystal cells. The first chiral cell reflects incident light within the first color band and in a first polarization state, and the second chiral cell reflects incident light within the second color band and in a second polarization state.

A light modulator, which is operable to change the polarization state of incident light passing through it, is positioned between the light polarizing assembly and the first and second liquid crystal chiral cells. A switching means or circuit delivers signals to the light modulator for selectively providing first and second switching states. The first switching state causes light within the first color band to exit the color filter and blocks light within the second color band from exiting the color filter. The second switching state causes light within the second color band to exit the color filter and blocks light within the first color band from exiting the color filter.

Another preferred embodiment of the switchable color filter is capable of receiving light within three color bands and selectively providing a light output of one of three colors.

Each of the preferred embodiments can be implemented as part of a high-efficiency field sequential color camera system or of an image projection system. In the camera system, the switchable color filter is positioned upstream of a light-sensitive detector, which sequentially converts light image information in each color into a corresponding video signal. In the projection system, the switchable color filter is positioned downstream of a cathode-ray tube, which sequentially emits a series of image frames, each image frame including a sequence of three fields corresponding to image information in a different one of three colors. The switchable color filter operates in synchronism with the cathode-ray tube to develop light images in the color corresponding to the light image information.

The camera system and projection system are insensitive to restricted viewing angles, which stem from the use of chiral liquid crystal cells. The switchable color filter of the present invention can be implemented in other applications that do not require large viewing angles. A switchable color filter using chiral liquid crystal cells can achieve two to four times greater light transmission than a switchable color filter using dye-type polarizing filters, depending on whether the color filter provides a two color or three color output. The reason is that dye-type polarizing filters are inherently less efficient in transmitting colored light.

Additional objects and advantages of the present invention will be apparent from the following detailed description of preferred embodiments thereof, which proceeds with reference to the accompanying drawings.

DETAILED DESCRIPTION OF PREFERRED EMBODIMENTS

Limited Color Embodiment of Switchable Color Filter

Figure 1:
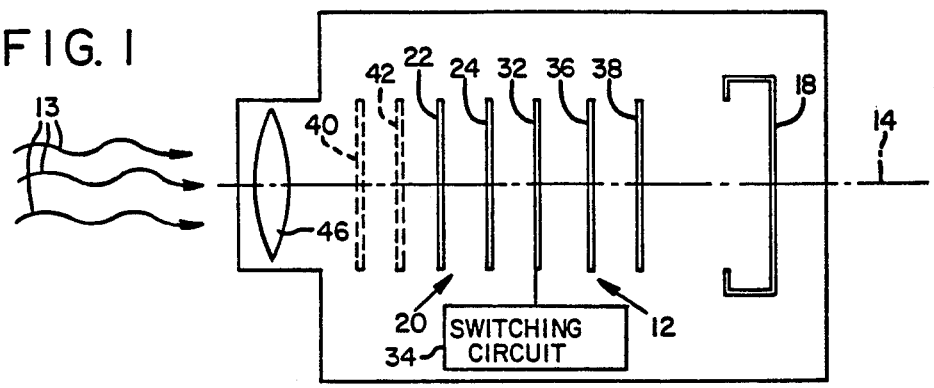
FIG. 1 is a diagram of a color camera that employs a preferred embodiment of a two color switchable color filter of the present invention.

FIG. 1 is a diagram of a limited color camera system 10 that incorporates a first preferred embodiment of a switchable color filter 12 of the present invention. Camera system 10 receives unpolarized visible light rays 13 in two narrow color bands scattered by a subject or emanating from a light source. For example, one of the color bands includes red light and the other color band includes green light. Light rays 13 propagate along an optic axis 14 through an imaging lens assembly 46 positioned at the aperture of camera system 10. Switchable color filter 12 polarizes the light passing through it and selectively provides a light output of one of the two colors. The light rays exiting switchable color filter 12 strike a detector 18, which develops two video signals in accordance with the selective transmission of light of the two colors in alternate sequence. One video signal corresponds to image information in the color red, and the other video signal corresponds to image information in the color green. The images corresponding to the video signals produced by camera 10 are in colors that range between the spectral positions of the two colors, i.e., red and green, exiting color filter 12.

Figure 2A:
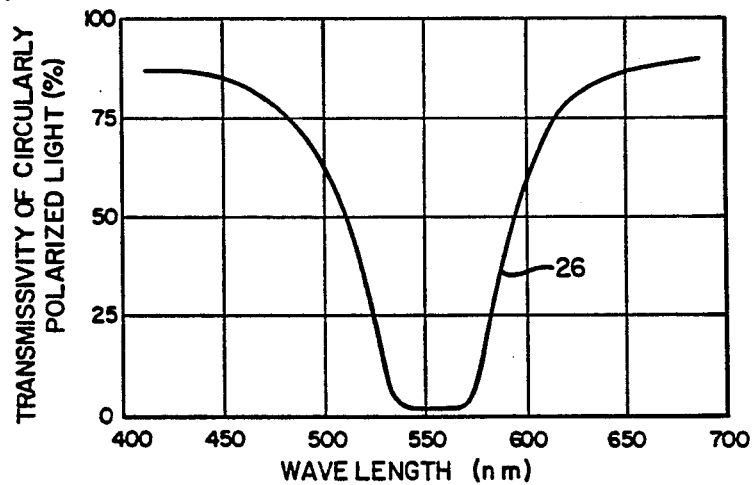
FIGS. 2A and 2B are graphs showing the approximate transmissivity characteristic and reflectivity characteristic, respectively, of a chiral liquid crystal cell receiving circularly polarized light in the preferred embodiments of the present invention.
Figure 2B:
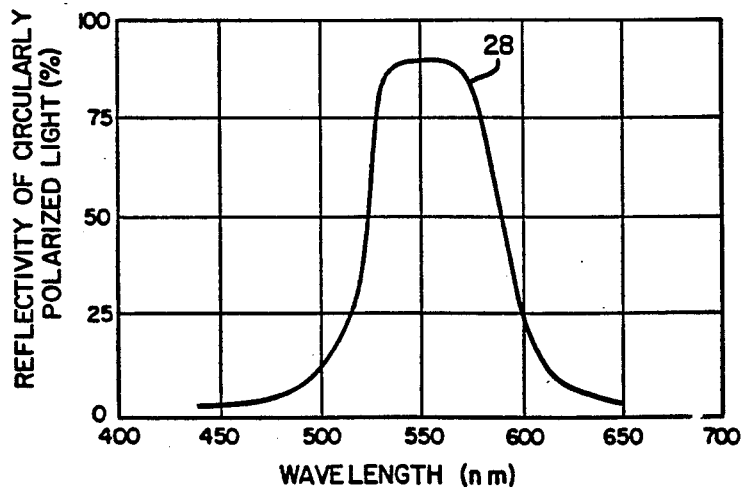

Switchable color filter 12 includes a polarizing assembly or means 20 that comprises two plane parallel left-hand twist chiral liquid crystal cells 22 and 24, which are tuned to the respective colors green and red. Chiral liquid crystal cells are known in the art and function in a manner similar to that described for a cholesteric layer discussed in the article "Twisted nematic display with cholesteric reflector," *J. Phys. D: Appl. Phys.*, Vol. 8, 1441-48 (1975), by Scheffer. The unpolarized light rays propagating through lens 46 strike chiral cell 22, which reflects only left-circularly polarized green light within narrow wavelength range of about 40 nanometers and transmits all other incident light. FIGS. 2A and 2B show the approximate transmissivity characteristic 26 and reflectivity characteristic 28, respectively, of a chiral liquid crystal cell that is tuned to reflect 550 nanometer (i.e., green) light. Since unpolarized light represents the superposition of left-and right-circularly polarized light, right-circularly polarized green light, together with unpolarized red light, exits chiral cell 22. The light exiting chiral cell 22 strikes chiral cell 24, which reflects only left-circularly polarized red light within a narrow wavelength range of about 40 nanometers and transmits all other incident light. Right-circularly polarized green light and right-circularly polarized red light exit chiral cell 24.

The right-circularly polarized green light and right-circularly polarized red light exiting chiral cell 24 propagate through a variable optical retarder 32, which changes the rotational sense of the polarization state of incident light rays by changing the amount of retardation imparted to them as they travel through it. Variable optical retarder 32 is preferably of the liquid crystal type described below. Variable optical retarder 32 selectively develops in response to two voltage signals developed by a switching circuit or means 34 zero retardation for all wavelengths of normally incident light and half-wave retardation of normally incident light of the wavelength to which variable optical retarder 32 is tuned. The two amounts of retardation cause circularly polarized light rays in one of two orthogonally related rotational senses to exit variable optical retarder 32.

Variable optical retarder 32 is tuned to provide half-wave retardation of green light. The amount of retardation developed by variable optical retarder 32 determines, therefore, whether left- or right-circularly polarized green light exits variable optical retarder 32. Whenever it is biased to provide half-wave retardation of green light, variable optical retarder 32 passes near left-circularly polarized red light, i.e., red light that is elliptically polarized to a small degree.

The light exiting variable optical retarder 32 propagates toward first and second color selective light-reflecting elements 36 and 38, each of which comprising a chiral liquid crystal cell. Chiral cell 36 is tuned to reflect right-circularly polarized red incident light and transmit all other incident light, and chiral cell 38 is tuned to reflect left-circularly polarized green incident light and transmit all other incident light. Chiral cells 36 and 38 are, therefore, of opposite-hand twists.

Camera system 10 operates in the following manner. Whenever image information of light in a first or green color is to be transmitted to detector 18, switching circuit 34 applies a first voltage signal to variable optical retarder 32 to command it to the zero retardation or "ON" state. Variable optical retarder 32 receives the right-circularly polarized green light rays and right-circularly polarized red light rays carrying the image information and transmits them to chiral cell 36. Chiral cell 36 reflects the right-circularly polarized red light back toward variable optical retarder 32 and transmits the right-circularly polarized green light to chiral cell 38. Chiral cell 38 transmits the right-circularly polarized green light, which exits switchable color filter 12 and strikes detector 18.

Whenever image information of light in a second or red color is to be transmitted to detector 18, switching circuit 34 applies a second voltage signal to variable optical retarder 32 to command it to the half-wave retardation or "OFF" state. Variable optical retarder 32 receives the right-circularly polarized red light rays and the right-circularly polarized green light rays carrying the image information, converts the green light to left-circular polarization and the red light to near left-circular polarization, and transmits the green light and red light to chiral cell 36. Chiral cell 36 transmits the left-circularly polarized green light and left-circularly polarized red light to chiral cell 38, which reflects the left-circularly polarized green light back through chiral cell 36 and transmits the left-circularly polarized red light. The left-circularly polarized red light exits switchable color filter 12 and strikes detector 18.

Switchable color filter 12 may also include dichroic filters 40 and 42 (shown in phantom in FIG. 1) which reject light of wavelengths outside the red and green color bands of the respective chiral cells 36 and 38. For example, filter 40 would reject light of wavelengths corresponding to yellow, and filter 42 would reject wavelengths within the range corresponding to cyan through blue. Switchable color filter 12 promotes an increased light throughput because chiral cells 36 and 38 absorb a smaller amount of the light they transmit than do the dye-type polarizing filters. That chiral cells 36 and 38 pass light which is perceptible within only a restricted range of viewing angles is of no consequence in camera 10 because it forms video signals from only the light propagating through imaging lens 16 positioned at its aperture.

It will be appreciated that chiral cells 22 and 24 may be replaced by a neutral linear polarizer and a quarter-wave plate, which form a circular analyzer that develops right-circularly polarized light. The circular analyzer is, however, an imperfect substitute for chiral cells 22 and 24 because the quarter-wave plate can be tuned to only one wavelength (e.g., yellow, which has a near-central spectral position between red and green). This causes less than complete reflection of the color of light to be prevented from exiting switchable color filter 12 and thereby introduces a small amount of color contamination into the intended light output color. Variable optical retarder 32 can be tuned to provide half-wave retardation of a particular color of light to control the amount of contamination introduced into an intended output color.

Full Color Embodiment of Switchable Color Filter

Figure 3:
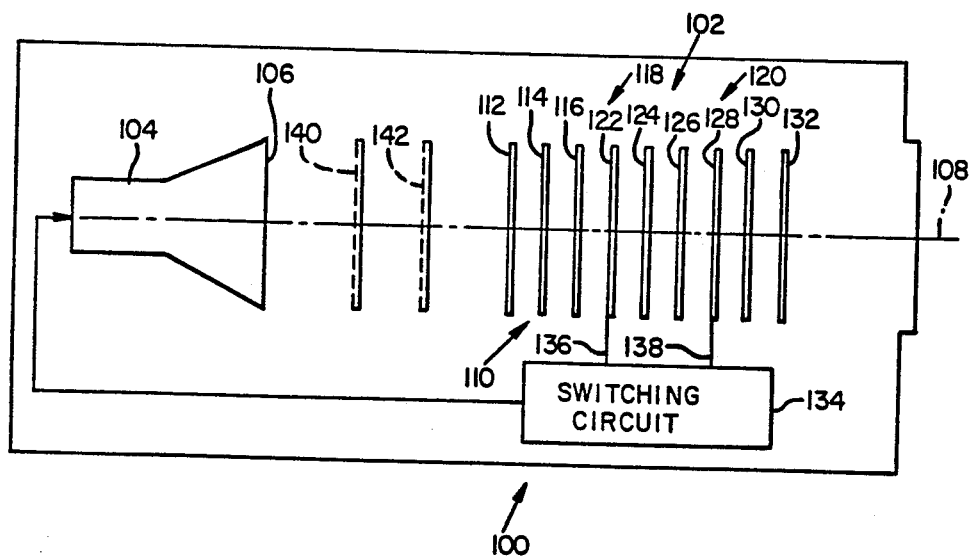
FIG. 3 is a diagram of a color projection system that employs a preferred embodiment of a three color switchable color filter of the present invention.

FIG. 3 is a diagram of a full color projection system 100 that incorporates a second preferred embodiment of a switchable color filter 102 of the present invention. Projection system 100 includes a light source 104, such as a cathode-ray tube, which emits from its screen 106 unpolarized light rays that carry image information in three narrow color bands. Each color band includes, for example, a different one of the colors red, green, and blue. Cathode-ray tube 104 provides a series of image frames, each image frame including a sequence of three fields corresponding to image information in a different one of three colors red, green, and blue. The light emanating from cathode-ray tube 104 propagates along an optic axis 108 through switchable color filter 102, which polarizes the light and selectively provides a light output of one of the three colors red, green, and blue. The light of the three image fields exiting switchable color filter 102 forms a full color image in colors that range between the spectral positions of the longest (i.e., red) and shortest (i.e., blue) wavelengths of the three colors exiting switchable color filter 102. The full color image is projected onto a viewing screen (not shown).

Switchable color filter 102 includes a polarizing assembly or means 110 that comprises three plane parallel right-hand twist chiral liquid crystal cells 112, 114, and 116, which are tuned to the respective colors green, red, and blue. For the reasons stated above with respect to polarizing assembly 20 of camera system 10, left-circularly polarized light rays of the colors green, red, and blue exit chiral cell 116. The left-circularly polarized light rays exiting chiral cell 116 propagate toward a first light modulating section 118 and a second light modulating section 120, which are positioned in series along optic axis 108.

First light modulating section 118 comprises a variable optical retarder 122 and first and second color selective light reflecting elements 124 and 126, each of which comprising a chiral liquid crystal cell. Chiral cell 124 is tuned to reflect left-circularly polarized blue incident light and transmit all other incident light, and chiral cell 126 is tuned to reflect right-circularly polarized red incident light and transmit all other incident light. Variable optical retarder 122 is tuned to provide half-wave retardation of red light. Second light modulating section 120 comprises a variable optical retarder 128 and third and fourth color selective light-reflecting elements 130 and 132, each of which comprising a chiral liquid crystal cell. Chiral cell 130 is tuned to reflect left-circularly polarized green incident light and transmit all other incident light, and chiral cell 132 is tuned to reflect right-circularly polarized blue light and transmit all other incident light. Variable optical retarder 128 is tuned to provide half-wave retardation of green light. Each one of variable optical retarders 122 and 128 selectively develops in response to two voltage signals developed by a switching circuit or means 134 zero retardation for all wavelengths of normally incident light and half-wave retardation of normally incident light of the wavelength to which the variable optical retarder is tuned in the manner described above for variable optical retarder 32 in camera system 10.

Projection system 100 operates in the following manner. Whenever image information of light in a first or red color is to be projected onto a viewing screen, switching circuit 134 provides a first voltage signal on each of its output conductors 136 and 138, which deliver the first voltage signal to variable optical retarders 122 and 128, respectively. The first voltage signal commands variable optical retarders 122 and 128 to the zero retardation or "ON" state. Variable optical retarder 122 receives the left-circularly polarized green, red, and blue image information-carrying light rays and transmits them to chiral cell 124. Chiral cell 124 reflects the left-circularly polarized blue light back toward variable optical retarder 122 and transmits the left-circularly polarized green and red light to chiral cell 126. Chiral cell 126 transmits the left-circularly polarized green and red light to variable optical retarder 128, which transmits them to chiral cell 130. Chiral cell 130 reflects the left-circularly polarized green light back toward variable optical retarder 128 and transmits the left-circularly polarized red light to chiral cell 132. Chiral cell 132 transmits the left-circularly polarized red light, which exits switchable color filter 102 and strikes the viewing screen.

Whenever image information of light in a second or green color is to be projected onto a viewing screen, switching circuit 134 provides a second voltage signal on its first output conductor 122, which delivers the second voltage signal to variable optical retarder 122, and provides the first voltage signal on its output conductor 138, which delivers the first voltage signal to variable optical retarder 128. The second voltage signal commands variable optical retarder 122 to the half-wave retardation or "OFF" state, and the first voltage signal commands variable optical retarder 128 to the zero retardation or "ON" state. Variable optical retarder 122 receives the left-circularly polarized green, red, and blue light rays carrying the image information, converts the red light to right-circular polarization and the green and blue light to near right-circular polarization, and transmits the green, red, and blue light rays to chiral cell 124. Chiral cell 124 transmits the right-circularly polarized red light, near right-circularly polarized green light, and right-circularly polarized blue light to chiral cell 126, which reflects the right-circularly polarized red light back through chiral cell 124 and transmits the near right-circularly polarized green light and right-circularly polarized blue light to variable optical retarder 128. Variable optical retarder 128 receives the near right-circularly polarized green light and right-circularly polarized blue light and transmits them to chiral cell 130. Chiral cell 130 transmits the right-circularly polarized green and blue light to chiral cell 132, which reflects the right-circularly polarized blue light and transmits the right-circularly polarized green light. Chiral cell 132 transmits the right-circularly polarized green light, which exits switchable color filter 102 and strikes the viewing screen.

Whenever image information of light in a third or blue color is to be projected onto a viewing screen, switching circuit 134 provides the second voltage signal on each of its output conductors 136 and 138, which deliver the second voltage signal to variable optical retarders 122 and 128, respectively. The second voltage signal commands variable optical retarders 122 and 128 to the half-wave retardation or "OFF" state. Variable optical retarder 122 receives the left-circularly polarized green, red, and blue light rays carrying the image information, converts the red light to right-circular polarization and the green and blue light to near right-circular polarization, and transmits the green, red, and blue light rays to chiral cell 124. Chiral cell 124 transmits the right-circularly polarized red light, near right-circularly polarized green light, and right-circularly polarized blue light to chiral cell 126, which reflects the right-circularly polarized red light back through chiral cell 124 and transmits the near right-circularly polarized green light and right-circularly polarized blue light to variable optical retarder 128. Variable optical retarder 128 receives the near right-circularly polarized green light and right-circularly polarized blue light, converts the green light to near left-circular polarization and the blue light to near left-circular polarization, and transmits the green light and blue light to chiral cell 130. Chiral cell 130 reflects left-circularly polarized green light and transmits the near left-circularly polarized blue light to chiral cell 132. Chiral cell 132 transmits substantially only the left-circularly polarized blue light, which exits switchable color filter 102 and strikes the viewing screen.

Figure 4:
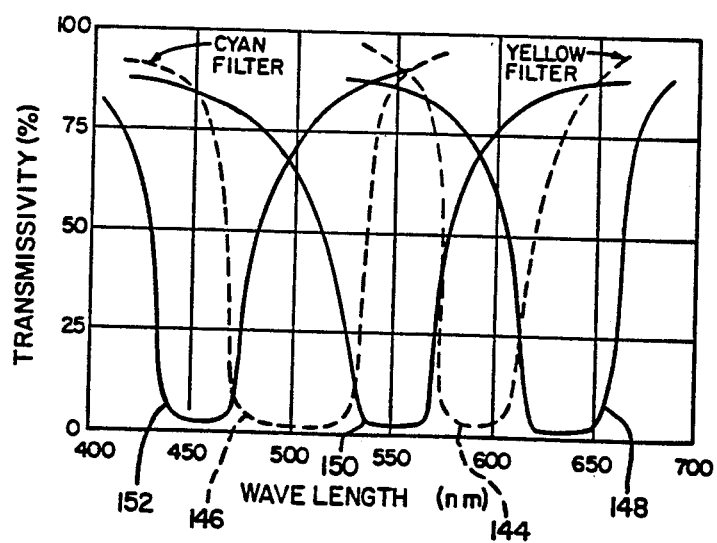
FIG. 4 are graphs of the transmission characteristics of dichroic filters employed in the switchable color filter of FIG. 3 to block the transmission of color components that lie between adjacent spectral positions of the colors of light polarized by the chiral filters.

Switchable color filter 102 may also include dichroic filters 140 and 142 (shown in phantom in FIG. 3) which reject, respectively, light of wavelengths between the red and green color bands (i.e., yellow reject filter) and light of wavelengths between blue and green color bands (i.e., cyan reject filter). FIGS. 4A and 4B show in phantom the approximate transmissivity characteristics 144 and 146 of the respective filters 140 and 142 superimposed on the transmissivity characteristics 148, 150, and 152 of the respective chiral cells 126, 130, and 132. (Transmissivity characteristic 152 also represents that of chiral cell 124.)

Liquid Crystal Variable Optical Retarder

Each of the preferred embodiments of the present invention incorporates a liquid crystal cell operating as a variable optical retarder that controls the retardation of light passing therethrough in response to the intensity of an electric field produced by an excitation voltage applied to the cell electrode structures. The following description is directed to the limited color embodiment 12 but equally applies to the full color embodiment 102.

Figure 5:
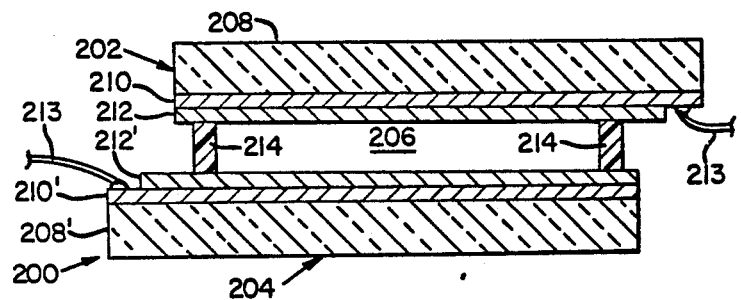
FIG. 5 is a diagrammatic cross-sectional view of a liquid crystal cell which is used as a zero to half-wave optical retarder in accordance with the present invention.

With reference to FIG. 5, liquid crystal cell 200 includes a pair of generally parallel, spaced-apart electrode structures 202 and 204 with nematic liquid crystal material 206 included therebetween. Electrode structure 202 comprises a glass dielectric substrate 208 that has on its inner surface a layer 210 of electrically conducting, but optically transparent, material such as indium tin oxide. Director alignment film layer 212 is applied to conductive layer 210 and forms a boundary between electrode structure 202 and liquid crystal material 206. The surface of film 212 which contacts the liquid crystal material is conditioned in accordance with one of two preferred methods to promote a preferred orientation of the directors of the liquid crystal material in contact therewith. The materials constituting and the corresponding methods of conditioning the director alignment film 212 are described in detail hereinbelow. Electrode structure 204 is of a construction similar to that of electrode structure 202, and the components corresponding to those of electrode structure 202 are shown with identical reference numerals followed by primes.

The short length edges of electrode structures 202 and 204 are offset relative to each other to provide access to conductive layers 210 and 210, for connecting at terminals 213 the output conductors of switching circuit 34. Spacers 214 comprised of any suitable material such as glass fiber preserve the general parallel relation between electrode structures 202 and 204.

Figure 6A:
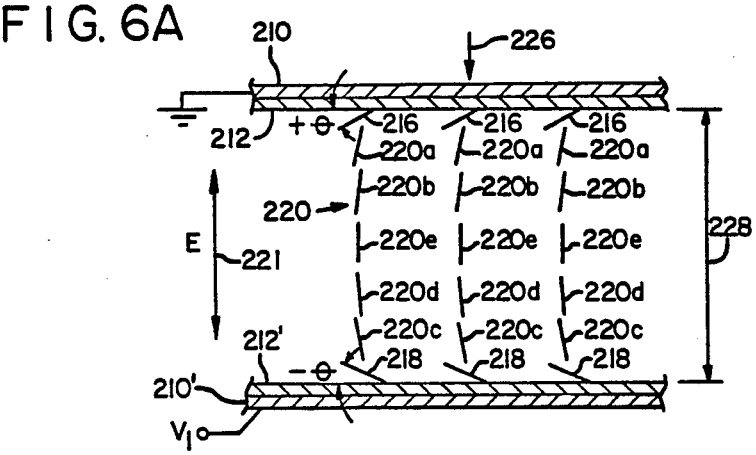
FIGS. 6A and 6B are schematic diagrams of the director alignment configuration of the liquid crystal cell of the variable optical retarder incorporated in the preferred embodiments of the switchable color filters of the present invention in, respectively, the field aligned "ON" state and the partly relaxed "OFF" state.
Figure 6B:
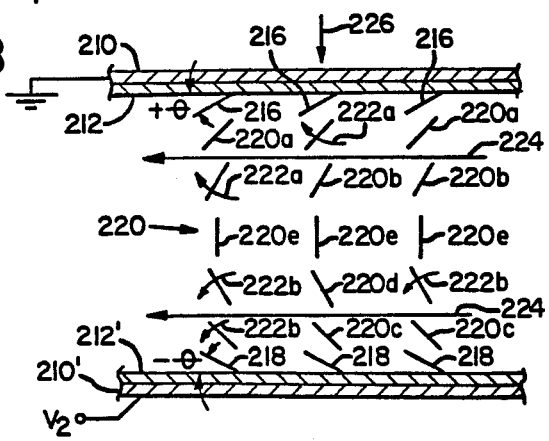

With reference to FIGS. 6A and 6B, the nematic director alignment configuration of layers 212 and 212' in liquid crystal cell 200 is described in Column 7, lines 4855 of U.S. Pat. No. 4,333,708 of Boyd, et al. It will be understood, however, that the liquid crystal cell described in the Boyd, et al. patent differs from that used in the present invention in that the former includes an alternating-tilt geometry type configuration of which the director alignment of cell 200 comprises only a portion. The cell of the Boyd, et al. patent is constructed to promote disclination movement within the cell in an attempt to provide a bistable switching device.

The film layer 212 of electrode structure 202 is conditioned so that the electrode structure surface contacting directors 216 are aligned parallel to each other at a tilt bias angle $+\theta$, which is measured in the counter-clockwise sense with reference to the surface of film layer 212. The film layer 212' of electrode structure 204 is conditioned so that the electrode structure surface contacting directors 218 are aligned parallel to each other at a tilt bias angle $-\theta$, which is measured in the clockwise sense with reference to the surface of film layer 212'. Thus, liquid crystal cell 200 is fabricated so that the surface contacting directors 216 and 218 of the opposed surfaces of director alignment layers 212 and 212' of electrode structures 202 and 204, respectively, are tilt-biased in opposite directions.

A first preferred method of effecting the desired alignment of the surface contacting directors entails the use of polyimide as the material that comprises the alignment film layers 212 and 212' on electrode structures 202 and 204, respectively. Each alignment film layer is rubbed to produce a tilt bias angle /θ/ with 2° to 5° being the preferred range. A second preferred method of effecting the desired alignment of the surface contacting directors entails the use of silicon monoxide as the material which comprises the alignment film layers 212 and 212' of electrode structures 202 and 204, respectively. The silicon monoxide layer is evaporated and vapor deposited preferably at a 5° angle measured from the electrode structure surface in an amount sufficient to produce a tilt bias angle /θ/ of between 10° to 30°, with 15° to 25° being the preferred range.

It will be appreciated that methods for depositing silicon monoxide or other alignment materials to align liquid crystal molecules in a predetermined direction have been disclosed previously by others and are known to those having ordinary skill in the art. One such method, for example, is disclosed in U.S. Pat. No. 4,165,923 of Janning.

FIG. 6A depicts the orientation of surface noncontacting directors 220 when an AC signal $V_1$ of approximately 2 KHz and 20 Vrms is applied to conductive layers 210 and 210' of electrode structures 202 and 204, respectively. The signal $V_1$ on conductive layer 220' with conductive layer 210 grounded constitutes a first switching state produced at the output of switching circuit 34 and produces an alternating electric field, E, between electrode structures 202 and 204 within the liquid crystal cell 200 to force the cell into its "ON" optical retardation state. A substantial number of the surface noncontacting directors 220 of a liquid crystal material 206 that has a positive anisotropy value align essentially end-to-end along direction 221 of the electric field flux lines within the cell, which direction is normal to the conditioned surfaces of the electrode structures. Thus, when cell 200 is excited into its "ON" state, the surface noncontacting directors 220 are aligned perpendicularly to the surfaces of the cell.

FIG. 6B depicts the orientation of surface noncontacting directors 220 after the signal $V_1$ is removed so that the alignment of surface noncontacting directors is influenced not by an electric field produced between electrode structures 202 and 204 within the cell, but by the intermolecular elastic forces which cause relaxation of the surface noncontacting directors from the end-to-end alignment of the "ON" state. The removal of signal $V_1$ constitutes a second switching state produced at the output of switching circuit 34. The director orientation shown in FIG. 6B corresponds to that of "OFF" optical retardation state of the cell.

Switching cell 200 to the "OFF" state can also be accomplished by applying to layer 210' of the cell an AC signal $V_2$ produced at the output of switching circuit 34 having a voltage level which is less than that of signal $V_1$ and generally near 0 V. The frequency of signal $V_2$ is generally the same as that of signal $V_1$.

During the transition from the "ON" state to the "OFF" state of the liquid crystal cell, the surface noncontacting directors recede from the end-to-end alignment normal to the electrode structure surfaces and attempt to assume a generally parallel relation with the adjacent directors. Thus, surface noncontacting directors 220a and 220b rotate in a clockwise sense as shown by direction arrows 222a in order to achieve a near-parallel relation as respects directors 216 and 220a, respectively; and surface noncontacting directors 220c and 220d rotate in a counter-clockwise sense as shown by direction arrows 222b to achieve a near-parallel relation as respects directors 218 and 220c, respectively. Thus, when cell 200 relaxes to its "OFF" state, each one of a substantial number of the surface noncontacting directors is aligned so that it projects a director component onto the surfaces of the cell. The surface noncontacting directors, however, lie approximately in a plane which is perpendicular to the surfaces of the cell.

The method of operating the liquid crystal cell 200 as a variable optical retarder is directed to the disclination-free surface noncontacting director relaxation from the electric field aligned or "ON" state depicted by FIG. 6A to the planar configuration or "OFF" state depicted by FIG. 6B. In the present invention, liquid crystal cell 200 is operated as a zero to half-wave retarder whose optic axis corresponds to the alignment direction of the surface noncontacting directors 220.

Linearly polarized light which propagates in direction 226 normal to the surfaces of electrode structures 202 and 204 is coincident with the direction of surface noncontacting directors 220 when the liquid crystal cell is in the "ON" state. Directors 220 are oriented in such "ON" state so that there is a negligible projection of the optic axis on the electrode structure surfaces of the cell. Under these conditions, liquid crystal cell 200 produces substantially reduced optical retardation for incident light propagating in the direction 226.

Linearly polarized light which propagates in direction 226 normal to the surfaces of electrode structures 202 and 204 is noncoincident with the alignment direction of surface noncontacting directors when the liquid crystal cell is in the "OFF" state. Directors 220 are oriented in such "OFF" state so that each one of a substantial number of them projects a component on the electrode structure surfaces of the cell. Under these conditions, liquid crystal cell 200 has an effective birefringence for generally normally incident light. The orientation of surface noncontacting directors 220 provides essentially half-wave optical retardation for light of the wavelength which satisfies the mathematical expression:

$$\tfrac{1}{2} = \Delta n d / \lambda,$$

where d represents the thickness 228 and $\Delta n$ represents the effective birefringence of the cell.

It will be obvious to those having skill in the art that many changes may be made in the above-described details of the preferred embodiments of the present invention without departing from the underlying principles thereof. For example, switchable color filter 102 can be substituted for switchable color filter 112 in camera system 10 to provide a full color camera system, and switchable color filter 12 can be substituted for switchable color filter 102 in projection system 100 to provide a limited color projection system. The scope of the present invention should be determined, therefore, only by the following claims.

I claim:

1. A highly transmissive switchable color filter that receives light having color components within first and second color bands, comprising:

polarizing means for polarizing light within the first and second color bands;

first and second color selective light-reflecting elements, the first light-reflecting element reflecting light within the first color band and in a first polarization state and the second light-reflecting element reflecting light within the second color band and in a second polarization state;

a light modulator positioned between the polarizing means and the first and second light-reflecting elements, the light modulator being operable to change the polarization state of light passing through it; and switching means in communication with the light modulator for selectively providing first and second switching states, the first switching state causing light within the first color band to exit the color filter and blocking substantially all of the light within the second color band from exiting the color filter, and the second switching state causing light within the second color band to exit the color filter and blocking substantially all of the light within the first color band from exiting the color filter.

2. The color filter of claim 1 in which the first and second light-reflecting elements include respective first and second chiral liquid crystal cells.

3. The color filter of claim 2 in which the first and second chiral liquid crystal cells are of opposite-hand twists.

4. The color filter of claim 3 in which the first chiral liquid crystal cell reflects incident light within the first color band and transmits other incident light and the second chiral liquid crystal cell reflects incident light within the second color band and transmits other incident light.

5. The color filter of claim 2 in which the first and second chiral liquid crystal cells are positioned in series along an optic axis, the one of the first and second chiral liquid crystal cells located nearer to the light modulator transmitting all light incident to it.

6. The color filter of claim 1 in which the light modulator comprises a variable optical retarder that produces a first amount of optical retardation in the first switching state and a second amount of optical retardation in the second switching state.

7. The color filter of claim 6 in which the first amount of optical retardation is zero retardation and the second amount of optical retardation is half-wave retardation.

8. The color filter of claim 6 in which the variable optical retarder comprises a liquid crystal cell comprising liquid crystal material which has directors and is contained between a pair of opposed electrode structures, each electrode structure having an inner surface that includes a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to that of the tilt bias angles of the directors in contact with the other conditioned surface.

9. The color filter of claim 1 in which the polarizing means includes a neutral linear polarizing filter and a quarter-wave plate to provide circular polarization of light incident to the polarizing means.

10. The color filter of claim 1 in which the polarizing means includes a pair of chiral liquid crystal cells that reflect light of the same polarization state but of colors that are within different ones of the first and second color bands.

11. The color filter of claim 1 which further comprises filter means positioned adjacent the polarizing means for rejecting light generally not within either one of the first and second color bands.

12. A highly transmissive switchable color filter that receives light having color components within first, second, and third color bands, comprising:
polarizing means for polarizing light within the first, second, and third color bands;
a first light modulating section including a first light modulator and first and second color selective light-reflecting elements, the first light modulator being positioned between the polarizing means and the first and second light-reflecting elements and being operable to change the polarization state of light passing through it, the first light-reflecting element reflecting light within a first color band and in a first polarization state and the second light-reflecting element reflecting light within a second color band and in a second polarization state;
a second light modulating section positioned adjacent the first light modulating section and including a second light modulator and third and fourth color selective light-reflecting elements, the second light modulator being positioned between the second and third light-reflecting elements and being operable to change the polarization state of light passing through it, the third light-reflecting element reflecting light within a third color band and in the first polarization state and the fourth light-reflecting element reflecting light within one of the first, second, and third color bands and in the second polarization state; and
switching means in communication with the first and second light modulators for selectively providing first, second, and third switching states, the first switching state causing light within the first color band to exit the color filter and blocking substantially all of the light in the second and third color bands from exiting the color filter, the second switching state causing light within the second color band to exit the color filter and blocking substantially all of the light within the first and third color bands from exiting the color filter, and the third switching state causing light within the third color band to exit the color filter and blocking substantially all of the light within the first and second color bands from exiting the color filter.

13. The color filter of claim 12 in which each of the first, second, third, and fourth light-reflecting elements is a chiral liquid crystal cell.

14. The color filter of claim 13 in which the first and second chiral liquid crystal cells are of opposite-hand twists and in which the third and fourth chiral liquid crystal cells are of opposite-hand twists.

15. The color filter of claim 14 in which the first, second, and third chiral liquid crystal cells reflect incident light within respective first, second, and third color bands and transmit other incident light, and in which the fourth chiral liquid cell reflects incident light within one of the first, second, and third color bands and transmits other incident light.

16. The color filter of claim 15 in which the fourth color filter reflects incident light within the first color band.

17. The color filter of claim 12 in which the first and second light modulators comprise respective first and second variable optical retarders that provide predetermined amounts of retardation in the first, second, and third switching states.

18. The color filter of claim 17 in which each of the first and second variable optical retarders provides either zero retardation or half-wave retardation in the first, second, and third switching states.

19. The color filter of claim 17 in which each of the first and second variable optical retarders comprises a liquid crystal cell comprising liquid crystal material which has directors and is contained between a pair of opposed electrode structures, each electrode structure having an inner surface that includes a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to that of the tilt bias angles of the directors in contact with the other conditioned surface.

20. The color filter of claim 12 in which the polarizing means includes three chiral liquid crystal cells that reflect light of the same polarization state but of colors that are within different ones of the first, second, and third color bands.

* * * * *